(12) United States Patent
Chandrasekhar et al.

(10) Patent No.: US 10,951,583 B1
(45) Date of Patent: *Mar. 16, 2021

(54) METHODS AND APPARATUS FOR CONTROLLING INTERNET ACCESS

(71) Applicant: Trend Micro Incorporated, Tokyo (JP)

(72) Inventors: Bharath Kumar Chandrasekhar, Santa Clara, CA (US); Narasimham Kodukula, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 16/548,287

(22) Filed: Aug. 22, 2019

Related U.S. Application Data

(63) Continuation of application No. 11/693,675, filed on Mar. 29, 2007, now abandoned, which is a continuation-in-part of application No. 11/537,483, filed on Sep. 29, 2006, now Pat. No. 8,838,773.

(51) Int. Cl.
*H04L 29/06* (2006.01)
*G06F 15/173* (2006.01)
*H04L 29/08* (2006.01)

(52) U.S. Cl.
CPC ...... *H04L 63/0236* (2013.01); *H04L 63/1433* (2013.01); *H04L 63/1441* (2013.01); *H04L 67/02* (2013.01)

(58) Field of Classification Search
CPC ............ H04L 63/0236; H04L 63/1433; H04L 63/1441; H04L 67/02; H04L 63/1416; H04L 63/168
See application file for complete search history.

(56) References Cited

U.S. PATENT DOCUMENTS

| | | | | |
|---|---|---|---|---|
| 7,849,502 B1* | 12/2010 | Bloch | ................... | H04L 63/168 726/11 |
| 2002/0052841 A1* | 5/2002 | Guthrie | ................ | G06Q 20/102 705/40 |
| 2006/0047755 A1* | 3/2006 | Jurova | .................... | H04L 67/02 709/206 |
| 2006/0288076 A1* | 12/2006 | Cowings | ................. | H04L 51/28 709/206 |
| 2007/0192855 A1* | 8/2007 | Hulten | ................ | H04L 63/1483 726/22 |
| 2008/0082662 A1* | 4/2008 | Dandliker | ............... | H04L 63/10 709/225 |

* cited by examiner

*Primary Examiner* — Shanto Abedin
(74) *Attorney, Agent, or Firm* — Okamoto & Benedicto LLP

(57) ABSTRACT

Apparatus and methods for controlling access by a browser to one or more Internet servers are disclosed. Access control is performed by ascertaining an IP address of an internet server that the user is trying to access and performing lookup of the IP address in an IP address rating database. If the lookup reveals that the IP address to be suspicious and data received from the internet server is encrypted, block the access to the internet server. Alternatively, if the lookup reveals the IP address to be suspicious, block the access to the first internet server by the browser without first performing content analysis on the data from the internet server.

12 Claims, 5 Drawing Sheets

METHODS AND APPARATUS FOR CONTROLLING INTERNET ACCESS

This application is a continuation-in-part application of a commonly-owned patent application entitled "Detecting Anonymized Data Traffic" (application Ser. No. 11/537,483, filed in the USPTO on Sep. 29, 2006, by the same inventors herein, which application is incorporated by reference herein.

CROSS-REFERENCE TO RELATED APPLICATION(S)

The present application is a continuation of U.S. patent application Ser. No. 11/693,675, filed Mar. 29, 2007, entitled "Methods and Apparatus for Controlling Internet Access," the disclosure of which is hereby incorporated by reference. U.S. patent application Ser. No. 11/693,675 is a continuation-in-part of U.S. patent application Ser. No. 11/537,483, filed Sep. 29, 2006 (now U.S. Pat. No. 8,838,773, issued Sep. 16, 2014), the disclosure of which is hereby incorporated by reference

BACKGROUND OF THE INVENTION

As the Internet continues to evolve, increasingly greater volume and variety of data is becoming available to computer users. Most of the available data (which includes both renderable text/graphics/audio data and executables) is benign or at worst not useful when accessed by a user via the Internet. However, some of the data may be objectionable and/or malicious. Preventing intentional or unintentional access to the malicious data is an important task for administrators and parents alike.

One way to prevent access to potentially malicious data involves the use of web filters and in particular URL filtering. Generally speaking, URL filtering works by examining the URL and blocking access to websites that have been deemed to be prohibited. For example, some URL filtering products are implemented as software in web filter gateways and function by checking the URL (Uniform Resource Locator) of web pages that are sent to the user's browser. If the URL associated with a webpage is found to be associated with a prohibited website, the gateway would block that web page from reaching the user's browser. For example, if website XYZ131.com is a prohibited website, any web page that contains the string "www.xyz131.com" in its URL would be blocked by the web filter from reaching the user's browser.

Clever users attempt to bypass or confuse web fibs by using anonymizers. There exist commercial websites offering anonymizer service to users. Instead of accessing the prohibited website directly, the user instead access the anonymizer website and employs the anonymizer website to perform the access to the desired destination site (e.g., the aforementioned xyz131.com). With some anonymizer sites, when the webpage is returned to the user, the URL of the webpage reflects the URL of the anonymizer website and not of the desired destination site (e.g., xyz131.com). Other anonymizer sites may alternatively or additionally encrypt the data, rendering it impossible for the web filters to ascertain the origin or content of the data.

Current solutions to combat anonymizers include blocking any data that is returned from known anonymizer sites, i.e., treating all data from known anonymizer sites as harmful. This approach is shown in prior art FIG. 1 wherein user 102 attempts via a browser to access destination website 104 via a commercially available amonymizing web server 106. In this case, a gateway 108 performs URL filtering on the data returned from anonymizing web server 106 would block all traffic from anonymizing web server 106, thus preventing data from prohibited destination website 104 from reaching user 102. In the example of FIG. 1, gateway 108 is implemented separately from a firewall 110 but these two functions may be implemented together in the firewall in some cases if desired.

However, this approach fails to detect data that has been anonymized by web servers that are not known to the web filtering software. For example, if an employee runs an anonymizer software on his home computer 112 as a user-hosted anonymizer software and accesses the anonymizer software from work to visit prohibited website 104, the anonymized data appears to the company's firewall at his work place as if that data comes from the employee's home computer 112. As such, the anonymized data is not blocked and web filtering is frustrated.

SUMMARY OF INVENTION

The invention relates, in an embodiment, to methods and apparatus for controlling access by a browser to one or more Internet servers. There is included ascertaining an IP address of a first internet server of said one or more internet servers. There is also included performing lookup of said IP address in an IP address rating database. If said performing said lookup reveals said IP address to be suspicious and data received from said first internet server is encrypted, there is also included blocking access to said first internet server by said browser.

The invention relates, in an embodiment, to methods and apparatus for controlling access by a browser to one or more Internet servers. There is included ascertaining an IP address of a first internet server of said one or more internet servers. There is also included performing lookup of said IP address in an IP address rating database. If said performing said lookup reveals said IP address to be suspicious, there is further included blocking access to said first internet server by said browser without first performing content analysis on said data from said first internet server.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

Prior art

DETAILED DESCRIPTION OF EMBODIMENTS

Figure 1:
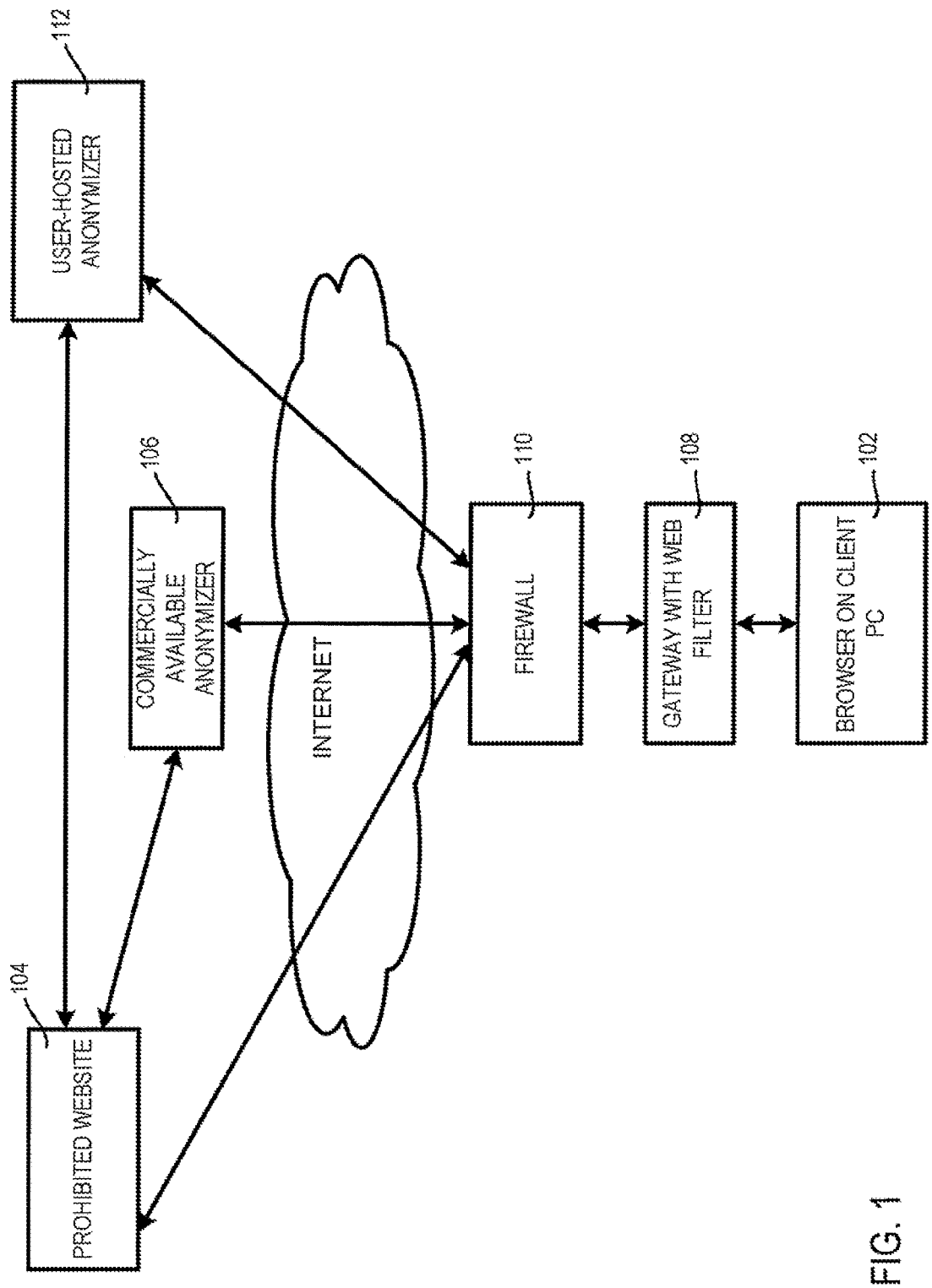
FIG. 1 illustrates a network environment to facilitate discussion of the anonymizer issue.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with an embodiment of the present invention, there are provided computer implemented methods and apparatuses for detecting and/or blocking anonymized data even if the user employs a web server that is not known to the web filter to be an anonymizing web server (such as a user-hosted anonymizer). In an embodiment, "HTTP 302 moved" messages destined to the users web browser are monitored. If a HTTP 302 moved message that is destined for a user's web browser is detected and the content of the HTTP 302 moved message includes an embedded URL string associated with the URL of a prohibited website, traffic from the web server that provides the HTTP 302 moved message is flagged as possible anonymized traffic, Depending on the web filtering policy, all traffic from the web server that provides the HTTP 302 moved message may be blocked, or the traffic may be flagged so that the administrator may investigate further, for example.

In another embodiment, the IP address of sites accessed by the user's browser is monitored. These IP addresses are looked up in a rating database that tracks suspicious web server IP addresses, i.e., those that should be treated as suspicious if they act as web servers. For example, IP addresses that are not suitable for e-commerce, including for example dynamically allocated IP addresses, may be treated as suspicious when they act as temporary web servers. The database may be maintained by a third-party service over the Internet, allowing the gateways to lookup the IP addresses in real-time (with caching performed at the gateway to improve performance, if desired).

If the IP address of an accessed site is deemed suspicious, the connection is then monitored for prohibited content. For example, traffic associated with that connection may be content-scanned for unapproved traffic, e.g., words or phrases that suggest sex, pornography, etc. If prohibited content is detected, enforcement nay take place and may include, for example, blocking all future traffic from the web server associated with that IP address. Additionally, the IP address of the web server that provides the prohibited content may be marked in the cache of the gateway database as an anonymizer. Additionally, the rating database may be updated so that if another user attempts to use the same web server to access a prohibited website, a lookup performed by that user's gateway against the rating server will suggest that the traffic be blocked.

Figure 2:
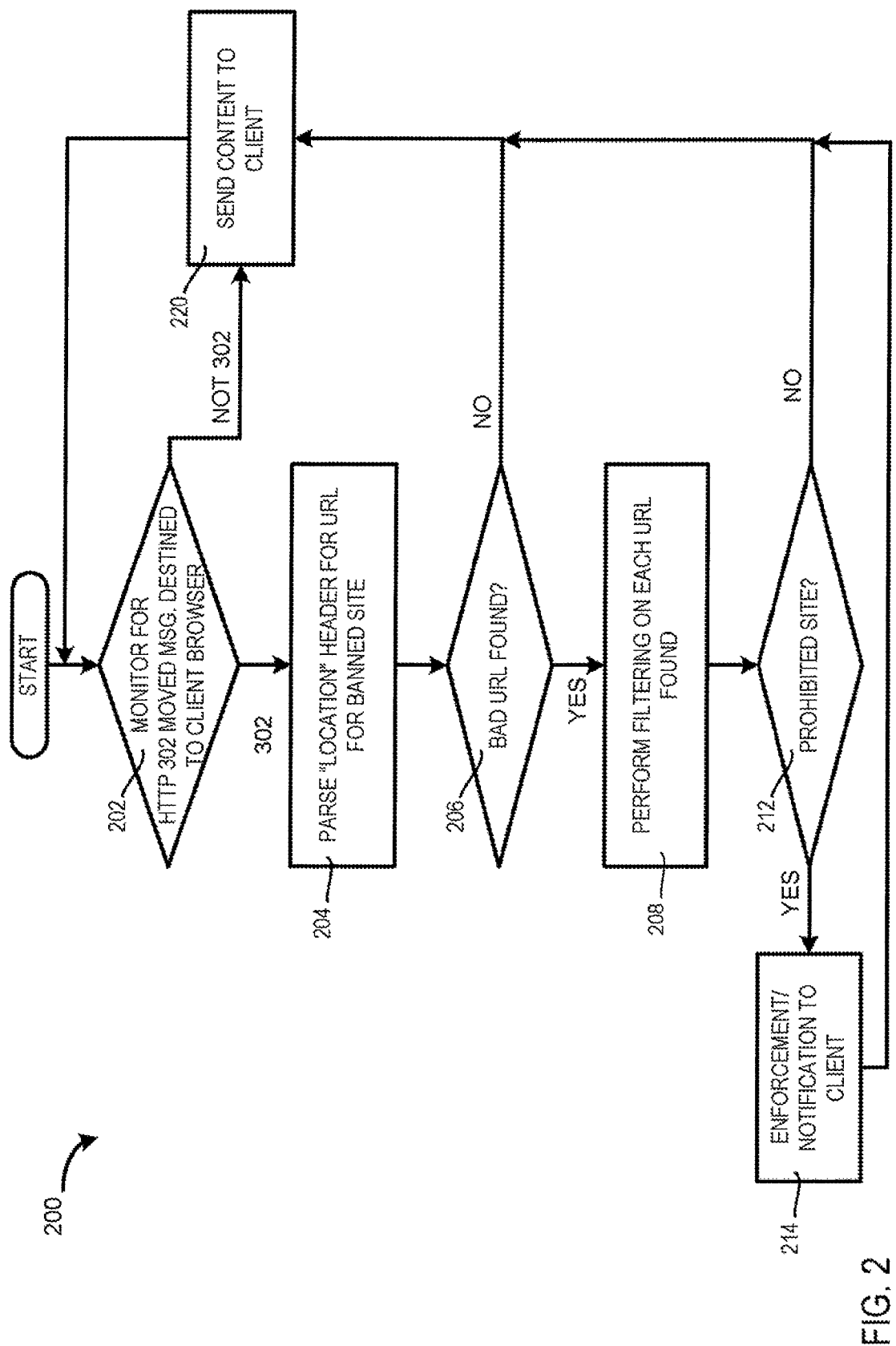
FIG. 2 shows, in accordance with an embodiment of the invention, a computer-implemented method for detecting anonymized data.

These and other features and advantages of the invention may be better understood with reference to the figures and drawings that follow. FIG. 2 shows, in accordance with an embodiment of the invention, a computer-implemented method 200 for blocking anonymized data. Generally speaking, method 200 is implemented by the network administrator or by an administrator of the firewall or gateway through which the user's internet traffic traverses. In step 202, the traffic destined for the user's browser is monitored for the "HTTP 302 moved" message.

The inventor herein observes that unencrypted anonymized traffic is often enabled in the following manner. First, the user employs a browser to access a web server that performs the anonymizing service. Assume for example that the URL for this anonymizing web server is www.sp15142.com. Sp15142.com then provides the user with a form to fill out in which the user can specify the URL of the destination web site he wishes to access.

Suppose the user wishes to access the site "www.aogoodsite1234.com" At this point, the user's browser performs a HTTP post to the IP address of www.sp15142.com with the content including "www.nogoodsite1234.com".

The web server at www.sp15142.com then sends back to the user's browser a HTTP 302 moved message with the "Location" field in the HTTP header having the URL string "www.riogoodsite1234.com" For example, the "Location" field in the HTTP header of the HTTP 302 Moved message may read "http://www.sp5142.com/a100qw3/http/www.nogoodsite1234.com".

The user's browser then performs a HTTP get on this new URL to obtain the data (once the OK 200 message is received). Note that this data now bypasses the web filter since it appears as if the data is transmitted between the user's web browser and the web server at www.sp15142.com.

in step 204, the "Location" field of the HTTP 302 moved message is parsed (assuming that the HTTP 302 moved message is detected in step 202). In this case, the parsing searches the "Location" string of the HTTP 302 moved message for embedded URLs (e.g., the aforementioned www.nogoodsite1234.com) and performs (yes branch of step 206) content filtering on web pages received from that site. By way of example, the gateway may perform a URL Filtering lookup (step 208) or may access the destination website (e.g., the aforementioned www.nogoodsite.com) directly to ascertain wieder the content received is of the type that is prohibited.

If the destination website is a prohibited website (yes branch of step 212), enforcement notification is provided (step 214) to the user and/or the administrator, informing that the attempted access is illegal.

On the other hand, if the destination website is not a prohibited site (no branch of step 212), the data is sent to the client's browser (step 220), reflecting the fact that the data is not found to be anonymized data. The data is also sent to the client's browser (step 220) if it is found in step 202 that the message is not a HTTP 302 moved message. Thereafter, control returns to step 202 to monitor the next message.

In some cases, the anonymizing web site actually encodes the URL of the destination website (e.g., ofwww.nogoodsite1234.com in the current example). Thus, www.nogoodsie1234.com may be encoded as "www.xyz5237.com". In these cases, a parsing of the HTTP 302 moved message would not result in the discovery of the attempt to access a prohibited website.

Figure 3:
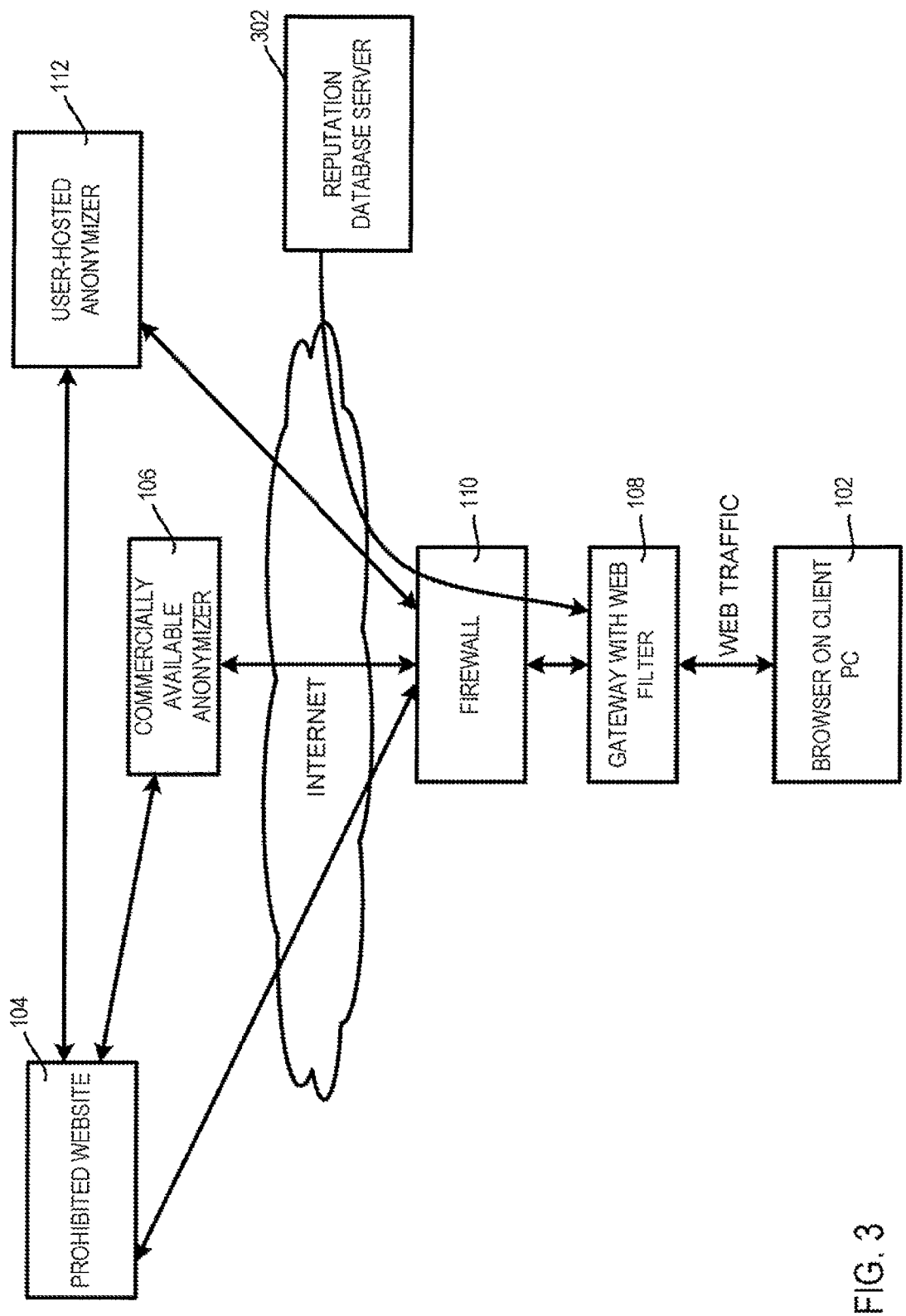
FIG. 3 shows, in accordance with an embodiment of the invention, a network environment for detecting anonymized traffic.

In an embodiment of the invention, the IP address of sites accessed by the user's browser is monitored. These IP addresses may be obtained from the URLs entered and are looked up in a rating database, which tracks IP addresses that should be treated as suspicious if they act as web servers. Thus, in FIG. 3, the IP addresses of web servers accessed by the user's browser are looked up using a rating database 302. Generally speaking, the rating database may be thought of as a reputation database, which tracks IP addresses and rates them for their susceptibility to being employed as a temporary server.

For example, the rating database 302 may receive information about blocks of IP addresses that ISPs (Internet Service Providers) have assigned to PPPoE (Point-to-Point Protocol over Ethernet) users. As another example, rating database may track known spam IP addresses or may receive user input from other users regarding IP addresses of offensive web sites. In an embodiment, IP addresses associated with service levels unsuitable for e-commerce may be deemed suspicious.

If the IP address associated with the user's message is one of the IP addresses known by rating database 302 to be questionable, rating database 302 flags the IP address as being suspicious so that data exchanged with web servers at that IP address may be further examined as possible prohibited data.

Figure 4:
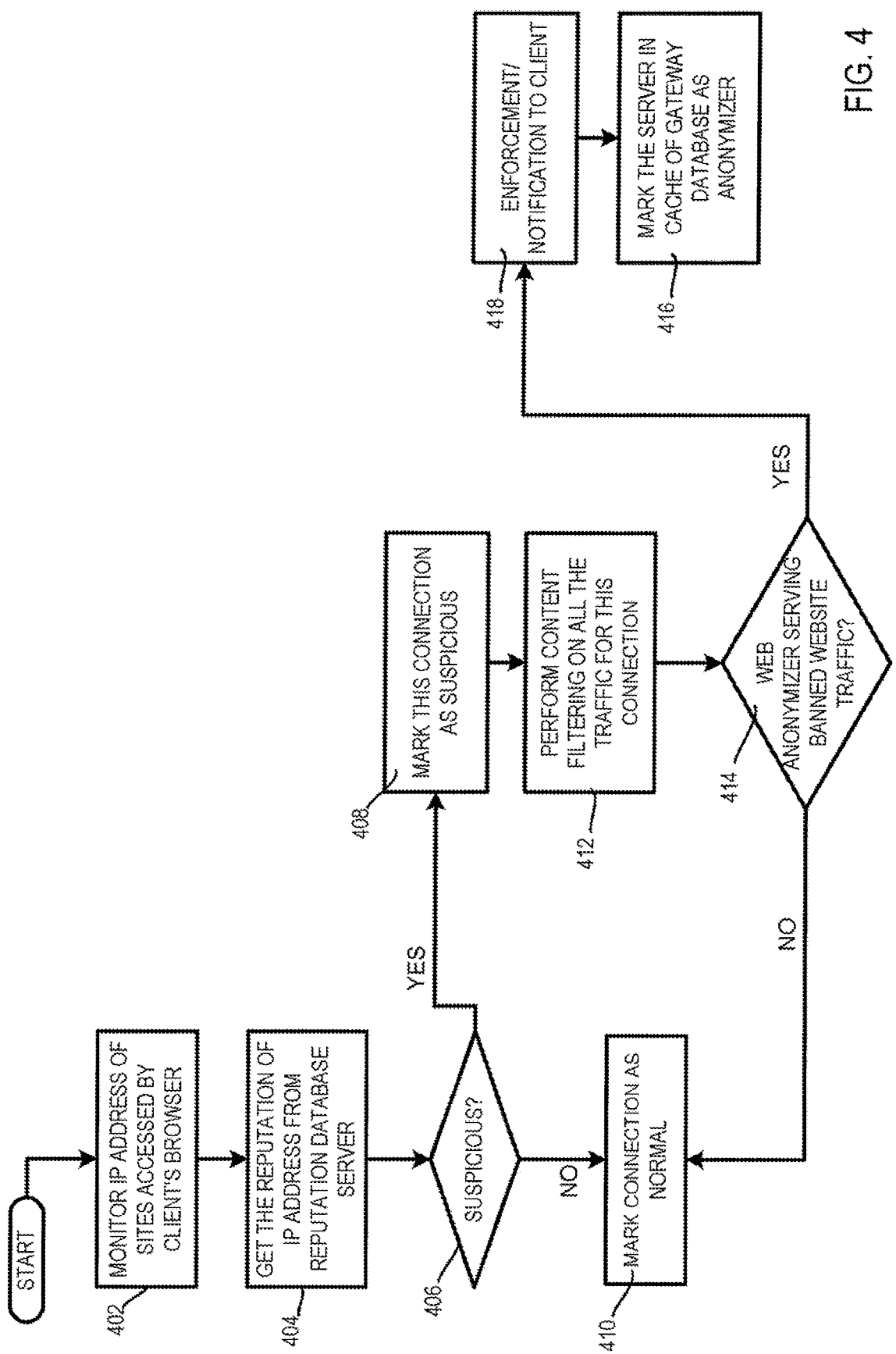
FIG. 4 shows, in accordance with another embodiment of the invention, a computer-implemented method for controlling access to one or more internet servers.

FIG. 4 is a flow chart 400 illustrating, in accordance with an embodiment of the present invention, the steps for controlling access to one or more internet servers. The method of FIG. 4 may be performed alternatively or additionally to the method of FIG. 3.

In step 402, the IP addresses of the sites accessed by the user's browsers are monitored. For each new site, the IP address is looked up using the rating server (step 404). If the IP address is rated as being suspicious by the rating server, traffic exchanged with the web server associated with that IP address is flagged for further investigation (the "yes" path out of step 406).

Thus, in step 408, the connection is marked as suspicious. In an embodiment, all traffic associated with a suspicious connection is content-filtered (412) to ascertain whether the content is prohibited. By way of example, the gateway may perform filtering through the content to look for prohibited words or terms that may suggest that the content is offensive and should be prohibited. In another embodiment, other types of heuristics filtering or URL filtering or other type of processing may be performed to determine whether the traffic is prohibited.

If the traffic is ascertained to be prohibited (the "yes" branch out of block 414), enforcement and/or notification may be made (418). In an embodiment, the user and/or the administrator is informed of the failed attempt to access the prohibited material. In step 416, the IP address associated with the prohibited traffic is marked in the cache of the gateway so that future traffic from the same IP address may be blocked. Further, the rating server may be updated to reflect the fact that the IP address has been employed as a web server to transmit prohibited content. In this manner, the rating server may respond to a subsequent inquiry from the same or another user's browser regarding the IP address.

On the other hand, if the traffic is ascertained not to be prohibited (the "no" branch out of block 414), the connection is marked to be normal and data is sent to the client's browser (step 420), reflecting the fact that the data is not found to be anonymized data. The data is also sent to the client's browser (step 420) if it is found in step 406 that the rating server does not deem the IP address to be suspicious. Thereafter, control returns to step 402 to monitor the next message.

Figure 5:
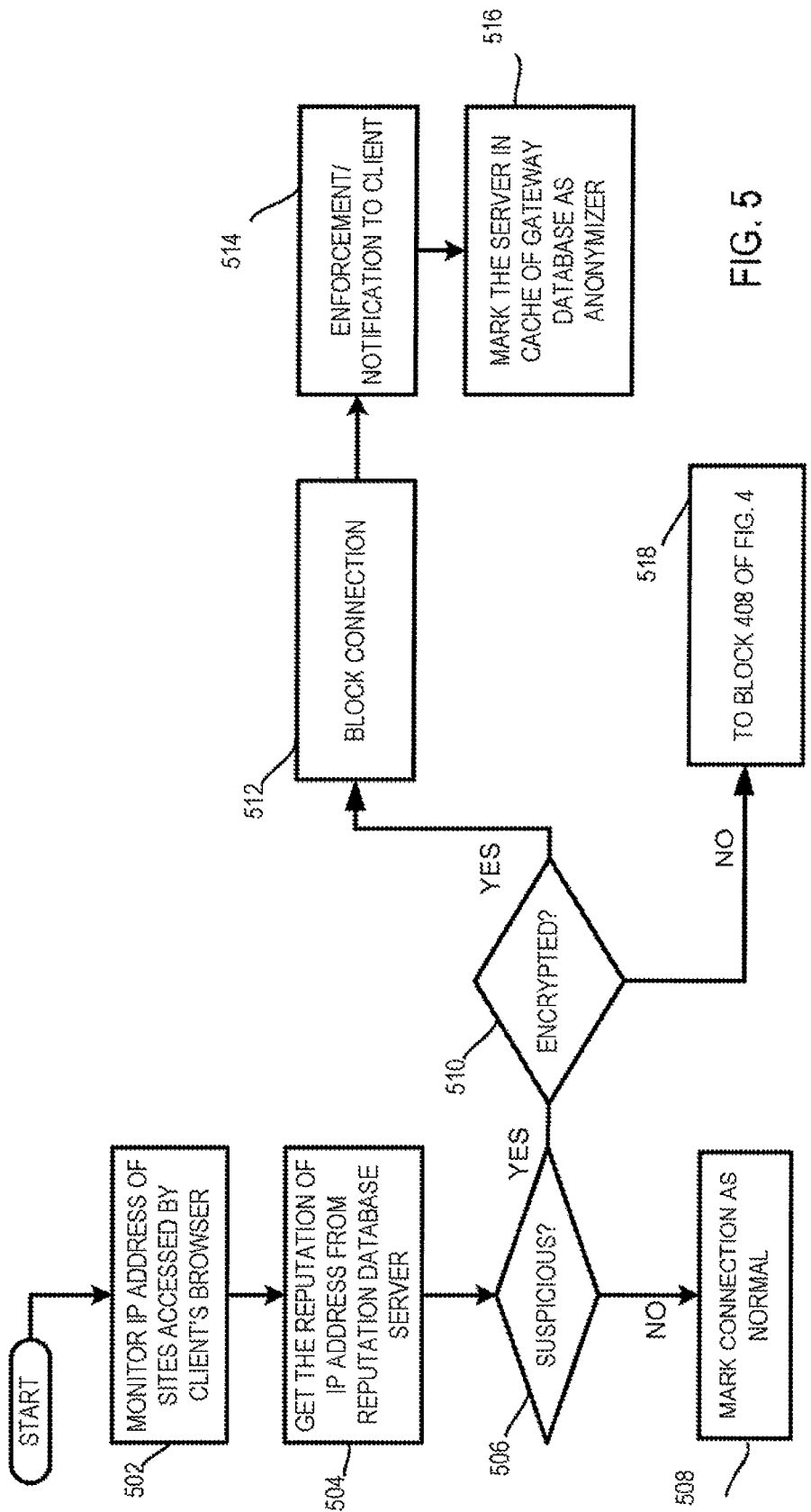
FIG. 5 shows, in accordance with another embodiment of the invention, a computer-implemented method for controlling access to one or more internet servers.

FIG. 5 is a flow chart illustrating, in accordance with an embodiment of the present invention, the steps for controlling access to one or more internet servers. The method of FIG. 5 may be performed alternatively or additionally to the method of FIG. 3, for example. One or more or all of the steps of FIG. 5 may be performed on a gateway device that is disposed in the data transmission path between a browser and the internet server that the user is attempting to access via the browser. Alternatively or additionally, one or more or all of the steps of FIG. 5 may be performed using the same computer that executes the browser.

In step 502, the IP addresses of the sites accessed by the user's browsers are monitored. For each site, the IP address is looked up using the rating server (step 504). If the IP address is rated as being suspicious by the rating server (506), and if traffic exchanged with the web server associated with that IP address is encrypted (as determined by block 510), the method proceeds to block the connection (512). Enclypted traffic refers to the use of encryption on data being transmitted and/or received, resulting in for example HTTPS traffic or any other type of encrypted traffic. Note that in contrast to the implementation of FIG. 4, no content filtering or analysis is required before blocking if traffic to/from a suspicious server is encrypted.

In this manner, even if the malicious content is cleverly disguised or created such that the malicious content can evade detection by today's malicious content detection techniques, the malicious data still cannot reach the user's browser since data associated with the suspicious connection is automatically blocked irrespective of what the content may represent. This is an example of pro-active malicious content blocking, which is distinguished from the situation wherein the content is blocked only if it matches a known malicious content signature.

In some cases, if the rating server does not recognize the IP address as one associated with a known and legitimate business, that IP address is deemed suspicious for blocking purposes if encrypted traffic is detected. Since the encrypting may prevent some or all of the traffic to be analyzed, such an approach advantageously eliminates the possibility of detection evasion via the encryption of unwanted data transmitted from the web server associated with the IP address that is unknown. This is another example of pro-active malicious content blocking.

In an alternative approach, if the rating server does not recognize the IP address as one associated with a known and legitimate business traffic (whether encrypted or unencrypted) to/from a server associated with that IP address may be blocked without requiring any further analysis or filtering. This more stringent approach advantageously serves the need of users who require strict access control to external servers. This is yet another example of pro-active malicious content blocking.

In step 514, optional enforcement and/or client notification may take places. Also in an optional step 516, the IP address associated with the prohibited traffic is marked in the cache of the gateway so that future traffic from the same IP address may be blocked. Further, the rating server may be updated to reflect the fact that the IP address has been employed as a web server to transmit prohibited content. In this manner, the rating server may respond to a subsequent inquiry from the same or another user's browser regarding the IP address.

If it is found in step 506 that the rating server does not deem the IP address to be suspicious (the "no" branch out of block 506), the connection is marked to be normal and data is sent to the client's browser, reflecting the fact that the data is not found to be anonymized data.

In an embodiment, if the traffic is deemed suspicious (block 506) but not encrypted (block 510), the method proceeds to block 408 of FIG. 4 to process the suspicious connection. Blocks 408, 412, 414, 416, and 418 have been discussed earlier and will not be repeated here.

As can be appreciated from the foregoing, embodiments of the invention can detect anonymize attempts even if the user employs an anonymizer service (such as an anonymizing software on his home computer) that is not known to be an anonymizer website. Additionally or alternatively, even if the anonymizer service encodes the URL of the destination website such that the URL no longer reflects the identity of the intended destination website, embodiments of the invention still can employ a rating server to detect suspicious connections to perform more in-depth analysis on the suspicious connections. Additionally or alternatively, data associated with a suspicious connections may be automatically blocked. Additionally or alternatively, data may be automatically blocked if it is encrypted. In this manner, more of the anonymized traffic may be detected and/or more malicious data may be blocked, thereby providing enhanced protection for the users.

While this invention has been described in terms of several embodiments, there are alterations, permutations, and equivalents, which fall within the scope of this invention. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A computer-implemented method for controlling access by a browser on a client device via a network device to one or more Internet servers, comprising:
    using said network device to monitor browser-destined traffic, said browser-destined traffic being destined for said browser, said network device being external to said client device and being connected to said client device;
    determining, using said network device, whether said browser-destined traffic contains one or more HTTP 302 Moved messages;
    when said browser-destined traffic contains an HTTP 302 Moved message, parsing said HTTP 302 Moved message to identify at least an embedded website address, and blocking access when a website associated with said embedded website address is a prohibited website;
    ascertaining an IP address of a first internet server of said one or more internet servers;
    performing lookup of said IP address in an IP address rating database; and
    when said performing said lookup reveals said IP address to be suspicious and data received from said first internet server is encrypted, blocking access to said first internet server by said browser,
    wherein said blocking is performed without first performing content analysis on said data from said first internet server, and
    wherein said blocking is performed when said first internet server is ascertained to be an anonymizing server.

2. The computer-implemented method of claim 1 wherein said IP address is deemed suspicious if said IP address is previously unknown to said IP address rating database.

3. The computer-implemented method of claim 1 wherein said IP address is deemed suspicious if said performing said lookup reveals that said IP address is associated with a service level that is unsuitable for e-commerce.

4. The computer-implemented method of claim 1, wherein said IP address is deemed suspicious if said IP address is previously unknown to said IP address rating database.

5. The computer-implemented method of claim 1 further comprising:
    if said performing said lookup reveals said IP address to be suspicious and data from said first internet server is unencrypted, performing content filtering on said data received from said first internet server.

6. The computer-implemented method of claim 1, wherein said controlling access is performed using a gateway device that is disposed in a data transmission path between said browser and said first internet server.

7. The computer-implemented method of claim 1 wherein said controlling access is performed using software that executes on the same computer that is employed to execute said browser.

8. An article of manufacture comprising a non-transitory program storage medium having computer readable code embodied therein, said computer readable code being configured for controlling access by a browser to one or more Internet servers, comprising:
    computer readable code for using said network device to monitor browser-destined traffic, said browser-destined traffic being destined for said browser, said network device being external to said client device and being connected to said client device;
    computer readable code for determining, using said network device, whether said browser-destined traffic contains one or more HTTP 302 Moved messages;
    computer readable code for, when said browser-destined traffic contains an HTTP 302 Moved message, parsing said HTTP 302 Moved message to identify at least an embedded website address, and blocking access when a website associated with said embedded website address is a prohibited website;
    computer readable code for ascertaining an IP address of a first internet server of said one or more internet servers;
    computer readable code for performing lookup of said IP address in an IP address rating database;
    computer readable code for blocking access to said first internet server by said browser when said performing said lookup reveals said IP address to be suspicious and data received from said first internet server is encrypted, wherein said blocking is performed without first performing content analysis on said data from said first internet server, and wherein said blocking is performed when said first internet server is ascertained to be an anonymizing server.

9. The article of manufacture of claim 8 wherein said IP address is deemed suspicious if said IP address is previously unknown to said IP address rating database.

10. The article of manufacture of claim 8 wherein said IP address is deemed suspicious if said performing said lookup reveals that said IP address is associated with a service level that is unsuitable for e commerce.

11. The article of manufacture of claim 8 wherein said IP address is deemed suspicious if said IP address is previously unknown to said IP address rating database.

12. The article of manufacture of claim 8 further comprising:
- if said performing said lookup reveals said IP address to be suspicious and data from said first internet server is unencrypted, performing content filtering on said data received from said first internet server.

\* \* \* \* \*